July 13, 1926.
J. H. O'NEILL
1,592,536
PNEUMATIC FORMING AND HOLDING OF RUBBER
Filed March 10, 1923    5 Sheets-Sheet 4
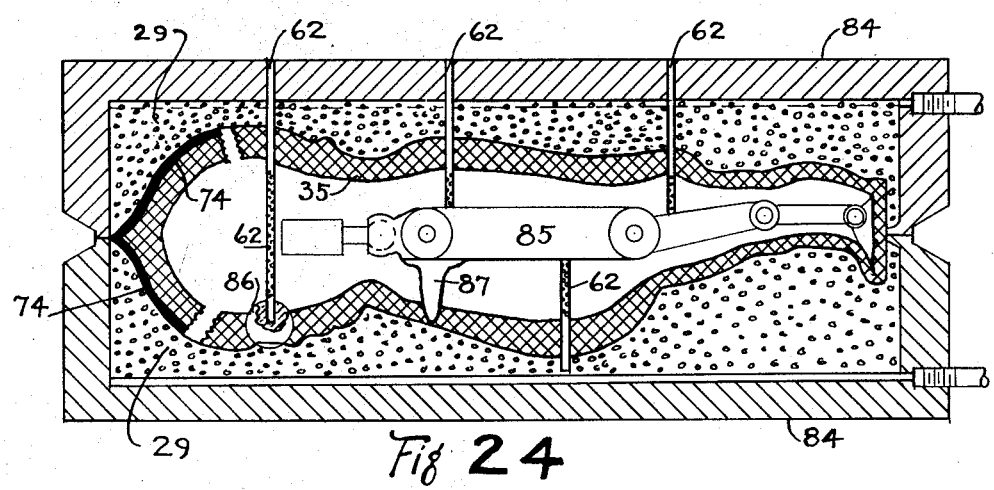
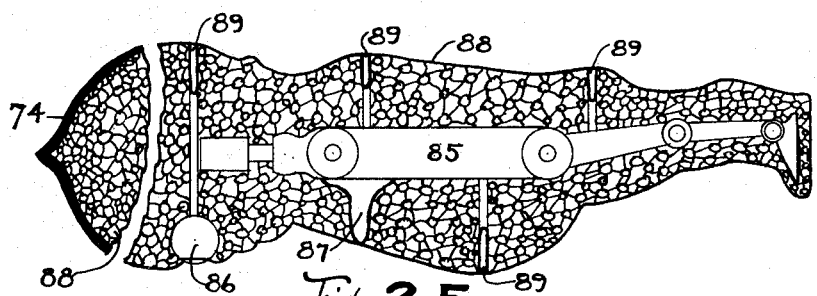
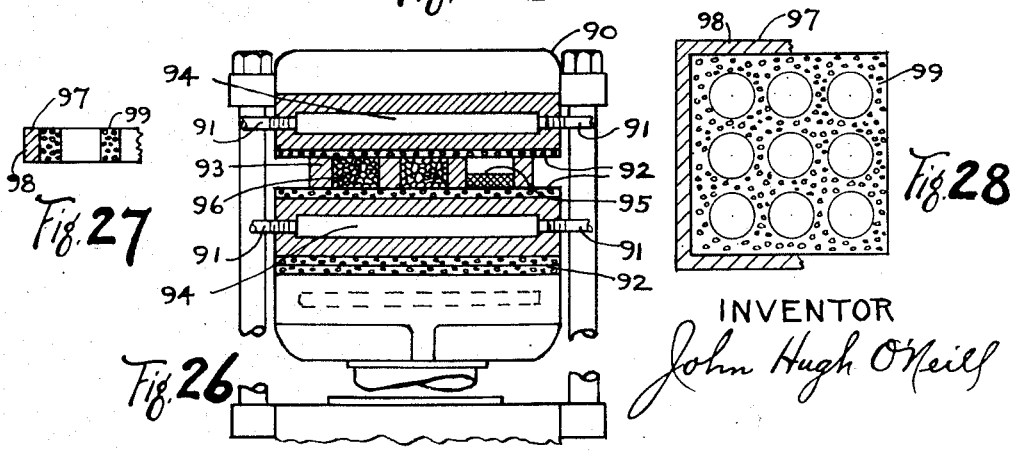
INVENTOR
John Hugh O'Neill July 13, 1926.

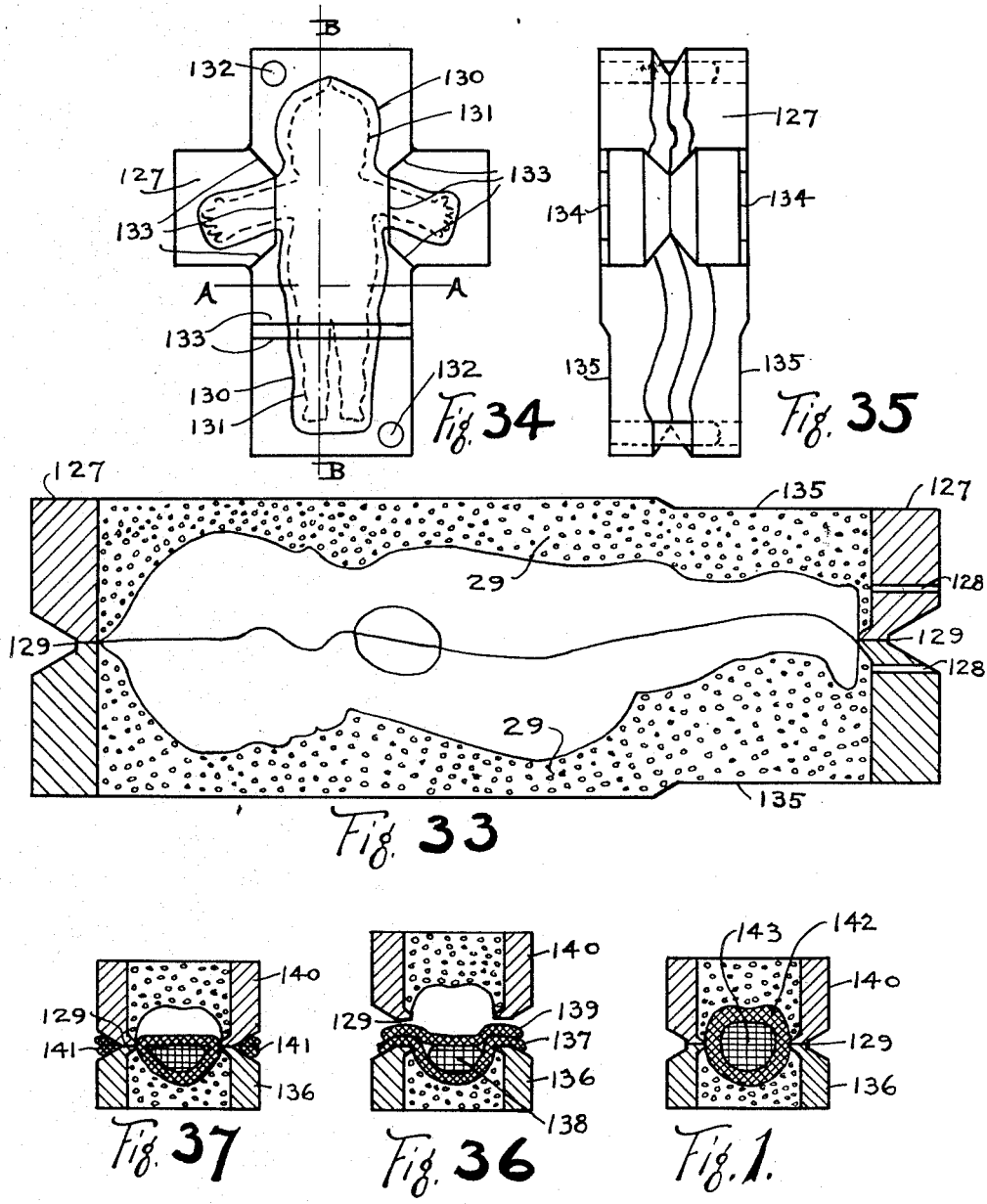

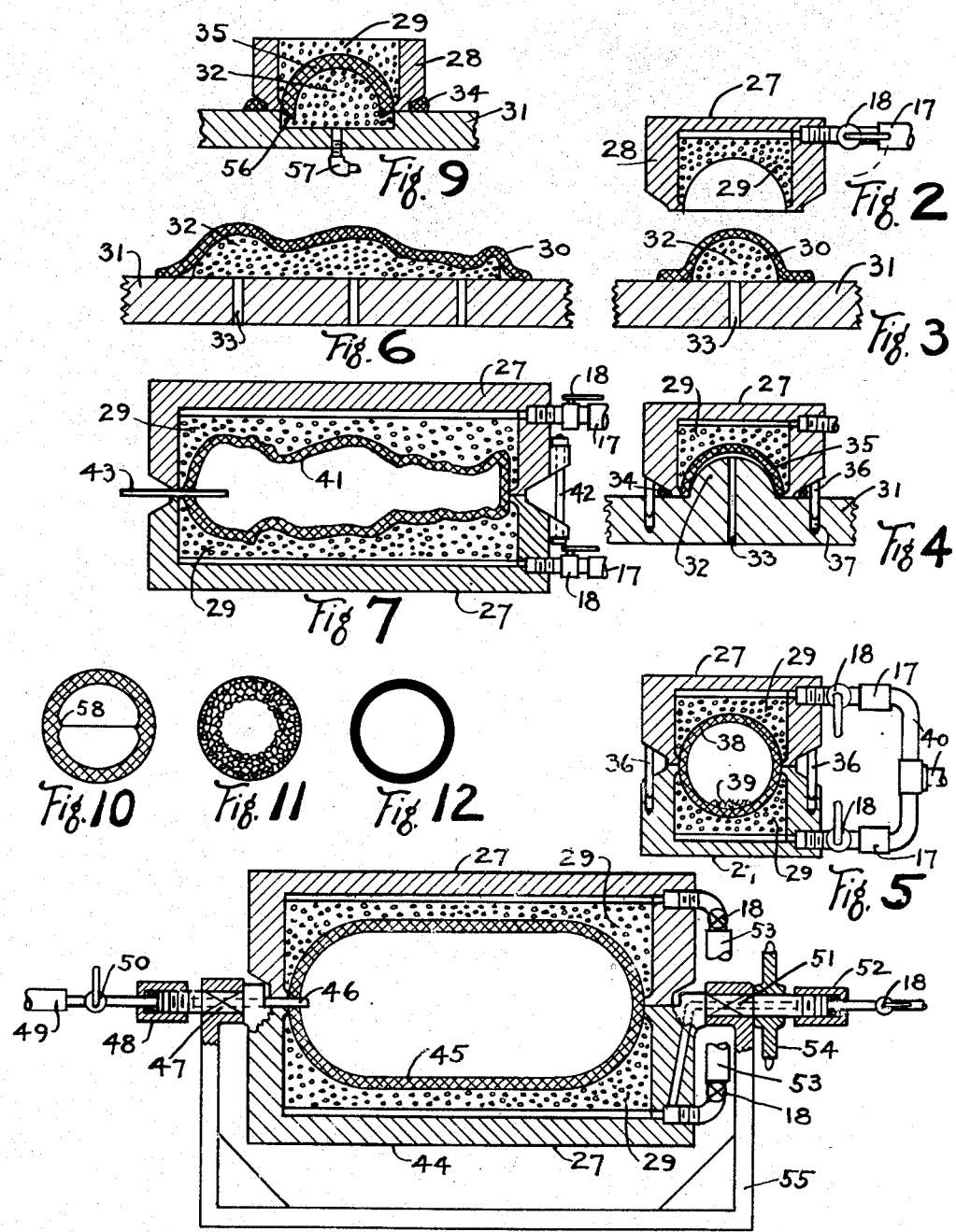

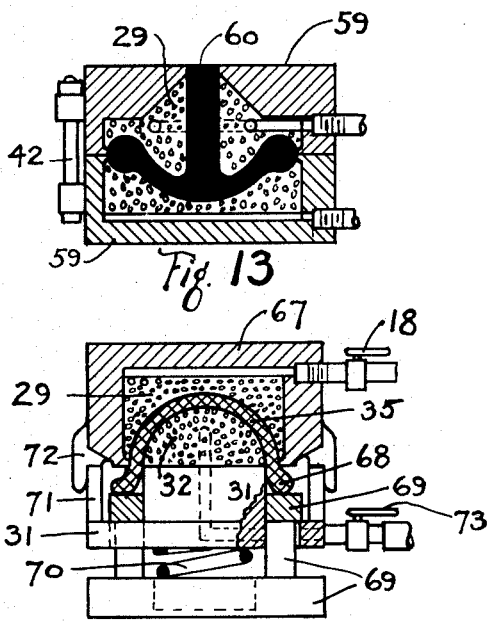
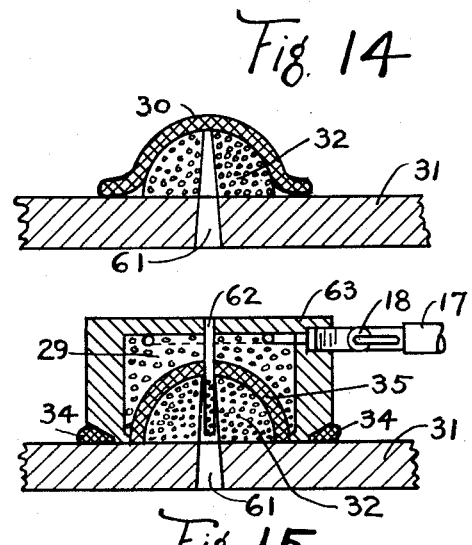
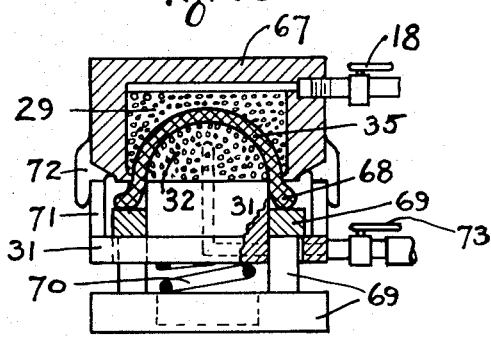
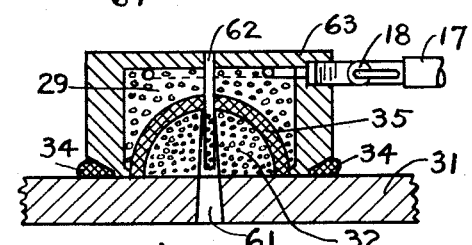
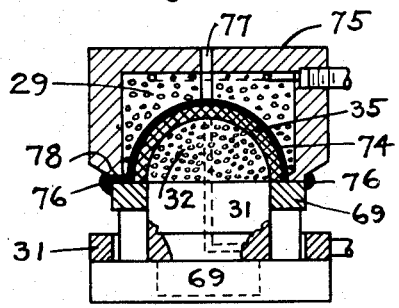
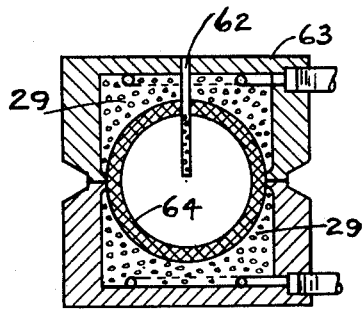
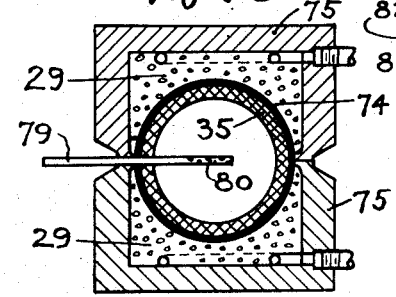
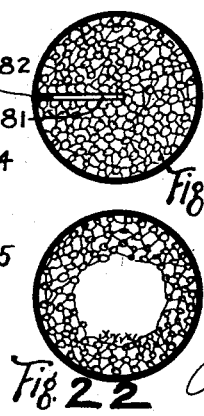
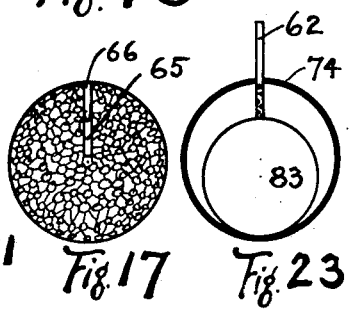

J. H. O'NEILL 1,592,536

PNEUMATIC FORMING AND HOLDING OF RUBBER

Filed March 10, 1923     5 Sheets-Sheet 5

INVENTOR
John Hugh O'Neill

Patented July 13, 1926.

1,592,536

UNITED STATES PATENT OFFICE.

JOHN HUGH O'NEILL, OF SPRINGFIELD, MISSOURI.

PNEUMATIC FORMING AND HOLDING OF RUBBER.

Application filed March 10, 1923. Serial No. 624,164.

My invention relates to an improved method of using pneumatic pressure for the forming of rubber articles and of using pneumatic or other fluid pressure for maintaining rubber articles in place against the mold walls during vulcanization. My invention also relates to vented molds of porous metal or other porous material. The vents of these molds are connected by suitable pneumatic tubes or conduits to the atmosphere which enables the air at greater pressure applied by any suitable means to force the raw rubber on which it presses into accurate contact with the mold. The mold surface being porous, any air trapped between the raw rubber and the mold, flows through the pores of the mold and through the vents to the lesser pressure of the atmosphere. Such molds are useful for forming rubber articles and holding them during vulcanization. My invention is operated in connection with suitable steam generators, air pumps, piping, valves and connections for the control of the various pneumatic and other fluid pressures as are used in standard practice.

My improved method and means make possible a reduction in the cost of forming rubber articles and a very marked improvement in the quality of the articles manufactured, also an almost complete elimination of culls by the use of my molds of porous material in which air pockets or blisters do not occur during the forming or vulcanizing processes.

My invention applies to the forming and vulcanizing of:

Formed hollow articles of dense rubber.
Formed hollow articles of sponge rubber.
Formed solid articles of dense rubber.
Formed solid articles of sponge rubber.
Formed articles of dense or sponge rubber in which cores or skeletons or mechanisms of various materials and shapes are embedded.
Formed hollow articles of sponge rubber with an adhering cover skin of dense rubber.
Formed articles of sponge rubber in which the sponge rubber fills the article, with an adhering cover skin of dense rubber, and numerous other arrangements and combinations of rubber articles.

To more clearly describe my invention, the accompanying drawings and description are appended; in which Fig. 1 is a cross section showing the sponge rubber of Fig. 37 expanded to fill the mold during vulcanization.

Fig. 2 is a cross section in elevation of a vented half mold with lining of porous material.

Fig. 3 is a cross section in elevation of a bottom plate or table with a boss on it for partially forming the raw rubber.

Fig. 4 is a cross section in elevation of Figs. 2 and 3 when brought together with the excess rubber stock cut off and the half of a hollow rubber article pressed upward against the mold by the greater air pressure on the lower side of the rubber.

Fig. 5 is a cross section in elevation of two vented half molds brought together with a hollow rubber article inside and with volatile matter enclosed in the article to create a suitable internal pressure during vulcanization.

Fig. 6 is a section of a bottom plate or table taken longitudinally through a formed boss suitable for partially forming the raw rubber stock for a hollow rubber doll.

Fig. 7 is a longitudinal section in elevation of the joined halves of a vented mold with a tube communicating with the interior of a hollow rubber article (in this case a doll) through which air, gas, vapor or liquid is introduced to maintain a suitable fluid pressure during vulcanization.

Fig. 8 is a longitudinal section in elevation of the joined halves of a vented mold suitable for the forming and the independent vulcanizing of a large hollow rubber article and adapted to be rotated during the process of vulcanizing.

Fig. 9 is a cross section in elevation of a half mold in position for the forming of a half of a hollow rubber article on a bottom plate with a special groove by which the rubber stock is formed so as to project beyond the face of the mold in order to insure an extra strong joint when mated with a similarly molded half.

Fig. 10 is a cross section in elevation of a hollow raw rubber article with joint or seam as formed by the means shown in Fig. 9.

Fig. 11 is a cross section of a hollow sponge rubber ball as formed by the method shown in Figs. 2, 3, 4 and 5 except that the volatile material shown in Fig. 5 may be omitted.

Fig. 12 is a cross section of a hollow dense rubber ball as formed by the method shown in Figs. 2, 3, 4, and 5.

Fig. 13 is a cross section in elevation of a closed two part vented mold suitable to receive dense raw rubber stock extruded from a machine into the mold for forming a solid rubber article of dense rubber and difficult and intricate shape.

Fig. 14 is a cross section in elevation of a bottom plate and boss for the partial forming of a hollow dense or sponge rubber article, the boss provided with a hole adapted to be entered by a venting needle.

Fig. 15 is a cross section in elevation of a top half mold and bottom plate with forming boss at the moment when a half article is formed, the excess cut off and the venting needle placed.

Fig. 16 is a cross section in elevation of a closed vented mold with venting needle in place, the mold containing raw sponge rubber stock for a ball.

Fig. 17 is a cross section of a sponge rubber ball formed as in Figs. 14, 15, and 16 with the hole left by the venting needle shown and a plug of self curing rubber inserted in the hole.

Fig. 18 is a partial section of half a vented mold and a vented subpress adapted to press the raw sponge rubber stock to accurate form and desired thickness before cutting off the excess stock.

Fig. 19 is a partial section in elevation of a half of a vented mold larger than that shown in Fig. 18 to allow a sheet of dense rubber being laid over the raw sponge stock as shown in Fig. 18 for the purpose of making a sponge rubber article with dense rubber skin.

Fig. 20 is a section in elevation of a closed vented mold loaded with dense rubber stock next the mold and raw sponge rubber stock inside with venting needle in place through which is introduced fluid pressure sufficient to cause the dense stock to vulcanize as dense rubber.

Fig. 21 is a cross section of a sponge rubber ball with dense rubber cover made as shown in Fig. 20.

Fig. 22 is a cross section of a hollow sponge rubber ball with dense rubber cover made as in Fig. 20 by providing a predetermined amount of raw sponge rubber stock and omitting the venting needle.

Fig. 23 is a cross section of a raw dense rubber ball formed as in Figs. 14, 15, and 16, with venting needle in place and with a ball of raw sponge rubber stock placed inside before closing—an alternative method of forming a ball to that shown in Fig. 21.

Fig. 24 is a section in elevation of a closed vented mold with a load of raw sponge rubber of varying thickness and an anatomy held in place by cured rubber supports and venting needles, the eyes also located and held by venting needles.

Fig. 25 is a longitudinal section of a sponge rubber doll formed and vulcanized in the mold shown in Fig. 24.

Fig. 26 is a partial section of a vulcanizing press with platens surfaced with porous metal.

Figs. 27 and 28 are sections of a suitable mold formed partly of porous metal for use with a press such as shown in Fig. 26.

Fig. 33 is a section on line B—B of Fig. 34 of a mold with porous metal lining and depressed parts where the smaller section of the article (in this case a doll) makes it desirable to reduce the rate of heat transfer.

Fig. 34 is a plan view of a mold with lining of porous metal and depressed parts suitable for vulcanizing an article of irregular section in a press vulcanizer.

Fig. 35 is a side view of Fig. 34 showing the depressed portions.

Fig. 36 is a section of the two halves of a porous metal lined mold taken on line A—A of Fig. 34 with an arrangement of raw sheet sponge rubber stock and an additional raw sponge rubber piece placed between the sheets where the article has larger section.

Fig. 37 is a cross section showing the mold of Fig. 36 closed with the excess stock cut off ready for removal.

Like numbers apply to similar parts which have similar functions.

Figure 29:
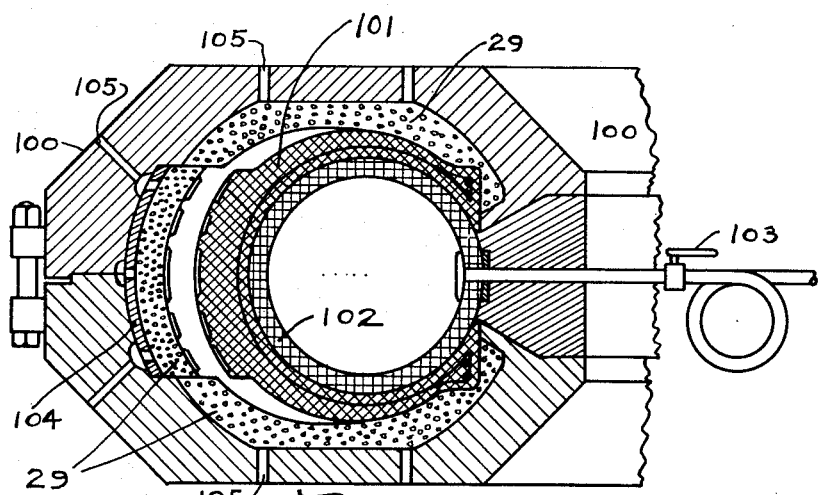
Fig. 29 is a partial section of a vented tire mold suitable for vulcanizing in a press or in open heat.

Fig. 2 shows a half mold 27 of suitable dense metal 28 with a lining of porous metal 29 which forms the wall against which the raw rubber will be held after being placed in the half mold 27 by the processes illustrated in Figs. 3 and 4. The raw rubber is held by pneumatic pressure. After the raw rubber is in place in the half mold 27, the air pressure in the porous metal lining 29 is reduced below the air pressure on the other side of the raw rubber by opening the valve 18 on the pneumatic tube communicating thru flexible connection 17 from the porous metal lining 29 to a source of lessened air pressure, not shown.

Fig. 3 shows a way of making a preliminary partial forming of the sheet stock 30 of raw rubber for a part of a hollow article by placing sheet 30 on a bottom plate 31 or other plate suitable to cooperate with the mold. To this plate 31 is fastened a forming boss 32 of shape and size suitable to give approximately the desired shape to the raw rubber sheet stock 30 which settles down over boss 32 by gravity. As the sheet stock 30 touches the top of the boss 32 first the sheet is not drawn thin at this point, but is formed partly by a drawing action to the form of the boss with the minimum change in thickness. The forming boss 32 may be of porous metal, as shown, and have vent 33 communicating with it so that the raw rubber sheet will not be held down by suction.

Fig. 4 illustrates how the half mold 27 is brought into contact with bottom plate 31 which cuts off the excess raw rubber at 34. The formed raw rubber stock 35 is shown forced up out of contact with boss 32 and against the porous lining 29. This position of the rubber stock is caused by the pneumatic pressure being greater on the side of the rubber next to the boss 32 than it is on the side next to the porous lining 29 as is the case when lining 29 is vented to the atmosphere or other lower pressure. Dowels 36 and dowel holes 37 act as guides.

Fig. 5 shows two half molds 27, 27, joined into a complete mold with a hollow rubber article 38 in place in the mold. As the mold is closed in a room or chamber with air at pressures above atmosphere the air enclosed in the hollow article is at a pressure greater than atmospheric, and as the air in the porous mold lining is at atmospheric pressure the article will be held in place against the face of the mold lining. This interior fluid pressure may be further increased by placing in the lower half of the article 38 before closing the mold, material 39 either solid or liquid which will volatilize with heat and produce a suitable fluid pressure in the hollow article such as will cause the rubber to remain dense and not become porous during vulcanization. The flexible connections 17, 17, may be connected by separate conduits to the atmosphere or to a branched connector 40 as shown. By opening valves 18, 18, the air pressure in the half molds 27 will remain at atmospheric while the hollow article 38 is being vulcanized with the result that the greater internal pressure will hold the rubber accurately against the face of the mold lining. Such a mold may be used both to form a hollow rubber article and to hold it while it is being vulcanized and thus avoid the annoyance and labor of transferring the article from the forming to the vulcanizing mold. Suitable guides for accurately closing the molds such as dowels 36 may be used, and the vulcanization may take place either in a press or in an open heat vulcanizer.

Fig. 6 shows the preliminary partial forming of raw rubber sheet 30 on a boss 32 of irregular shape. This method is particularly useful in cases where the rubber can be formed with the least variation of thickness, and where wrinkling of the sheet may be avoided without resort to any clamping means such as pneumatic clamping as is used in the pneumatic forming of hollow rubber articles from the flat sheet. The mold itself, in being brought against the rubber sheet preparatory to cutting off the excess rubber stock, forms sufficient clamp to hold the rubber while the final forming takes place pneumatically as is illustrated and described in Fig. 4.

Fig. 7 shows a closed mold containing a raw rubber hollow article 41 of irregular shape. Bolts 42 may be used to hold the mold together. Tube 43 may be used to introduce a suitable interior fluid pressure instead of the volatile material shown in Fig. 5. Tube 43 may be connected to a source of steam supply and the steam furnish both the suitable internal pressure and the heat for vulcanizing. Any other suitable fluid may be used under pressure including air, gas, vapor, or liquid.

Fig. 8 shows an arrangement suitable for the pneumatic forming and holding of large rubber articles in which the mold 44 is rotated during the process of vulcanization for the purpose of overcoming any tendency of the stock to run or flow to the lower half of the mold when it is softened by heat in vulcanization. This rotation of the mold is very useful in vulcanizing large hollow articles especially of sponge rubber. The hollow article 45 is held against the mold lining by fluid pressure admitted through the tube 46 which connects with hollow journal 47 and stuffing box 48. To stuffing box 48 steam or other hot fluid may be brought through connection 49 and valve 50 for the purpose of vulcanizing and at the same time providing a suitable internal pressure. A hollow journal 51 connects to the porous lining 29 in both halves of the mold and through the stuffing box 52 and valve 18 connection is made to the atmosphere to vent the mold. 53 is a flexible connection between the vents of the two halves of the mold 44. 54 is a sprocket wheel for rotating the mold. Any suitable drive may be used. 55 is a suitable support with bearings for journals 47 and 51. This apparatus may be used in an open heat vulcanizer in which the stuffing box 48 is omitted and steam from the open heater may be admitted into the article 45 in any convenient way, or the apparatus may be used as an independent vulcanizer. The mold is held together by suitable means such as by the bolts 42 in Fig. 7.

Fig. 9 illustrates a bottom plate with wedge shaped groove 56 in which the raw rubber is formed with a lip projecting beyond the face of the mold 28 so that when two such mold halves are closed there is greater thickness of rubber at the joint than in the balance of the article. Compressed air may be admitted at connection 57 to assist in removing the formed rubber 35 from the boss 32.

Fig. 10 shows a section through the joint 58 of a raw rubber article in which each half was formed on a bottom plate as shown in Fig. 9 so that the joint is thicker than the wall at other points.

Fig. 11 shows a section of a hollow sponge rubber ball which was made from raw sponge rubber stock by the methods and means shown in Figs. 2, 3, 4, and 5. In this case the volatile matter shown in Fig. 5 is not needed as dense rubber is not to be produced.

Fig. 12 shows a section of a hollow dense rubber ball made of dense rubber stock by means shown in Figs. 2, 3, 4, and 5 and the method described in the description of those figures.

Fig. 13 illustrates a type of mold suitable for forming dense rubber articles in which the raw rubber stock is extruded under pressure from an extruding machine (not shown) into the mold 59 until the mold is filled. This is accomplished readily as the air in the mold escapes through the porous lining 29 and the rubber 60 fills the mold accurately. The mold 59 may be held closed by bolts 42 and be provided with vents to the atmosphere to be used during the forming and vulcanizing or the rubber may be vulcanized in a press or open heat vulcanizer in the usual way using the usual pressure arrangements for producing dense rubber products.

Fig. 14 illustrates a sheet of raw sponge rubber stock 30 placed over a bottom plate 31 and forming boss 32. In this case a hole 61 may be provided in the bottom plate and boss adapted to receive a venting needle.

Fig. 15 illustrates a convenient way of inserting the venting needle 62 through the formed rubber stock 35 guided by the mold 63 so that the needle 62 enters the hole 61 in boss 32. The needle 62 makes, preferably, a close sliding fit in the mold 63 so that little air will leak from outside the mold into the porous lining 29. The needle 62 may be fixed in the mold 63 and be forced through the stock 35 at the operation of forming or the needle 62 may be slidable in the mold 63 and be forced through the stock 35 after the stock is formed. The needle 62 is made of a tube with a solid wall in the part held in the mold. The part projecting into the molded rubber article 35 may have various supplementary holes through the wall of the tube or this end may be of porous material preferably porous metal.

Fig. 16 illustrates a mold 63 closed, with a hollow article 64 of raw sponge rubber stock in place in the mold. The venting needle 62 is suitably placed to allow the air enclosed in the rubber 64 when the mold was closed to escape as the sponge rubber expands with heat during the vulcanizing. When a sufficient amount of raw sponge stock is used the rubber fills the mold making a solid sponge rubber article.

Fig. 17 is a section of a solid sponge rubber ball cut through at the small hole 65 made by the venting needle 62 (Fig. 16). A plug 66 of rubber such as self-curing stock may be inserted in the hole 65 by any suitable means for the purpose of making an unbroken surface on the ball.

Fig. 18 illustrates a combination of a forming mold 67, which forms the rubber stock 35 and forces out the excess rubber at 68, and of a sub-press 69 which cuts off the excess stock at 68 as the press completes its stroke. In this way a very accurate forming of the rubber stock is secured as well as a very precise and uniform measuring of the quantity of rubber. The bottom plate 31 which carries the forming boss 32 is in this case supported on the spring 70. Spring 70 is of sufficient strength to form the rubber stock 35 and to force out the excess stock from mold 67. Positive stops 71 are provided to fix the distance between porous mold lining 29 and boss 32 which determines the thickness of the rubber stock used. Suitable guides are provided as at 72. As the mold 67 and bottom plate 31 are forced downward together after the mold engages the positive stops 71, the sub-press 69 cuts off the excess stock 68 as is shown further in Fig. 19. When it is desired to have the formed rubber 35 remain in the mold 67 the valve 18 may be opened to the atmosphere and the valve 73 may admit air to the forming boss 32 at pressure above atmospheric, or compressed air from any source may be admitted, through valve 73 to boss 32. When it is desired that the formed rubber remain on boss 32, the valve 73 is connected to the atmosphere and atmoshperic pressure established in boss 32 while compressed air is admitted to the porous lining 29 of mold 67 through valve 18. Formed rubber 35 is retained on boss 32 when it is desired to add a covering of another quality of rubber over the formed rubber 35. Thus by means of forming surfaces of porous material and suitable connections to supplies of air at different pressures the action of the formed rubber can be controlled.

Fig. 19 illustrates a formed rubber 35 which may be of raw sponge rubber stock covered with a layer of rubber 74 of another quality which may be raw dense rubber stock. The mold 75 is shown in place with the excess rubber 76 from rubber 74 cut off by contact between the mold 75 and sub-press 69. In this case the final forming having been done, connection is made from mold 75 to the atmosphere and compressed air admitted through bottom plate 31 and boss 32 so that the composite rubber 35 and 74 will remain in the mold 75, held pneumatically by the air pressure which is greater than that in the porous lining of the mold. A hole 77 for venting needle 62 may be provided for a variety of purposes, one of which is illustrated in Fig. 24. A notch in the mold face at 78 which is shown full of excess dense rubber 76 may be provided for inserting a tube as is further described under Fig. 20.

Fig. 20 illustrates two half molds 75 brought together and filled with a composite rubber by the methods and means described under Figs. 18 and 19. In this case when it is desired to have a dense rubber cover 74 on a sponge rubber article it is necessary that a suitable pressure be maintained on the rubber during vulcanization to insure that the dense rubber 74 cures without bubbles and blow-holes in it. To conveniently apply such pressure the tube 79 is laid in the notch 78 as the mold is closed and is sealed in place by the rubber left in the notch 78 during the forming process. Any suitable fluid under pressure may be introduced through tube 79, such as air, gas, vapor or liquid. The sponge rubber stock 35 needs a larger proportion of volatile matter to enable it to expand against the fluid pressure used to keep the dense rubber solid than when it is only necessary to expand the sponge rubber against the air pressure as described under Figs. 16 and 17 where a solid sponge rubber article is produced. The mold lining of porous material 29 may be vented to the atmosphere or have any pressure maintained in it which is less by a suitable amount than the fluid pressure introduced into the article through tube 79. Tube 79 may preferably have an end 80 of porous material as shown or may be a plain tube.

Fig. 21 illustrates a section of a sponge rubber ball with a skin of dense rubber such as would be produced by the method and means described under Figs. 19 and 20. The hole 81 is left when tube 79 is withdrawn. Plug 82 may be of rubber of any suitable quality such as self-curing for the purpose of closing hole 81.

Fig. 22 illustrates in section a hollow sponge rubber ball with dense rubber skin. This ball is formed by the methods and means described under Figs. 18, 19 and 20 except that a thinner sheet of sponge stock 35 is used and the tube 79 is omitted. A suitable quantity of volatile material 39 as described under Fig. 5 may be introduced into the cavity in stock 35 before the mold is closed, for the purpose of furnishing the pressure required to cause the rubber skin 74 to cure into dense rubber.

Fig. 23 illustrates in partial section an alternative method for producing a sponge rubber ball or other article with dense rubber skin. The skin 74 is formed as in Figs. 14, 15 and 16 and sponge rubber 83 of a quantity suitable to fill the article is placed in the lower half mold inside the rubber 74 before the mold is closed. The venting needle 62 is held as in Fig. 16 and allows the air or other fluid in 74 to escape as the sponge rubber expands to fill the space. As it is necessary to vulcanize the dense rubber skin 74 under pressure above atmospheric in order to secure density it is necessary to vulcanize in open heat or in a press under suitable pneumatic pressure introduced through needle 62.

Fig. 24 shows in section a closed doll mold 84 with an arrangement for enclosing in the raw sponge rubber 35 any desired mechanism or substance such as the articulated skeleton 85 and eyes 86. Skeleton 85 may be supported and held in place by suitable supports such as cured rubber pieces 87 which will not soften during the vulcanizing heat. The venting needles 62 may also be used for supports. The sponge rubber 35 has been formed preferably by such methods and means as are described under Figs. 18, 19 and 20 in which a sheet of raw sponge rubber of uniform thickness may be formed between a mold and a boss on a bottom plate so that the sheet conforms to the mold and in this case the rubber of the sheet is also pressed thinner at the points where less stock is needed to fill the mold, the excess raw stock being pressed out of the mold and cut off by the sub-press. Any other suitable means may be used for forming the raw sponge stock to be in thickness in proportion to the space in the mold. The purpose of forming the raw stock so that it conforms in thickness to the thickness of the space between the inner faces of the mold lining is that better quality sponge is produced where the sponge does not need to flow laterally in the mold as it expands during the vulcanizing heat. A skin of dense rubber 74 may be placed over the sponge rubber stock when desired, by the methods and means described under Figs. 18, 19 and 20 including the same controls of the pressure inside the article and in the porous mold lining 29.

Fig. 25 shows a section of the doll of Fig. 24 after vulcanization illustrating how the sponge rubber stock expands from the shape shown in Fig. 24 to a complete filling with sponge rubber 88 of the cavity between the mold 84 and the skeleton 85; the eyes 86 are embedded in the sponge. 74 is dense rubber skin which may be used to cover sponge 88. Plugs 89 of suitable rubber may be used to fill the holes made by venting needles 62.

Fig. 26 shows a standard vulcanizing press 90 the platens of which are supplied with steam circulation through connections 91. In the past, the platens of such presses have been faced with cloth where rubber has been vulcanized while in contact with the platen, the cloth being useful in allowing the air to escape from the surface of the rubber, in this way obtaining a surface on the rubber free from air or other blisters or pockets. This cloth facing of the platens deteriorates rapidly with the heat and requires frequent renewal at the cost of material and labor. My porous metal is especially useful for such facing of platens as it does not deteriorate with heat or use. Such platen lining is shown at 92. A mold form 93 is shown in place between platens 94. Sponge rubber stock before vulcanizing is shown at 95 and after vulcanizing at 96. The air in the space above the raw sponge rubber stock 95 escapes readily through the porous metal lining 92 which allows the sponge to expand smoothly against the surfaces of lining 92.

Figs. 27 and 28 are vertical and horizonal sections respectively of a suitable mold form 97 for use in such presses as the one shown in Fig. 26. 98 is an outer wall of dense metal and 99 is the lining of porous metal, or other suitable porous material.

Fig. 29 shows a partial section of a tire mold 100, pneumatic tire casing 101 and rubber form bag 102 at the time before fluid pressure is admitted into form bag 102 through valve 103 and connection from a supply not shown. When form bag 102 is filled with fluid pressure it expands and stretches the tire carcass forcing the tire into contact with the surface of the mold. The space between the unstretched tire and the mold is shown exaggerated for clearness. The mold 100 and the tread strip 104 are lined with porous metal 29 which allows the tire to come to full contact with the tire mold as any air and gas is vented away through the porous metal lining 29 and various vents 105. Such a tire mold is suitable for use in vulcanizing in a press or open heat vulcanizer, care being taken that the fluid pressure in form bag 102 exceeds the fluid pressure outside the mold 100 by the amount needed to stretch the tire carcass and insure the vulcanization of the rubber in dense form.

Figure 30:
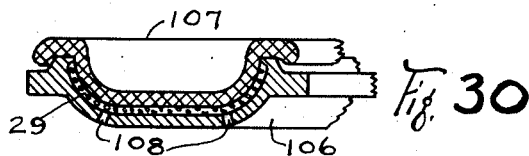
Fig. 30 is a partial section of a lower half of a vented inner tube mold with a sheet of raw stock placed over it.

Fig. 30 is a partial section of a lower half mold 106 for an inner tube with a sheet of suitable raw rubber stock 107 laid on the half mold 106 where it has been allowed to settle down into the lower half mold by gravity. The air which is trapped between the stock 107 and the face of the mold lining 106 is vented out through the porous lining 29 and vent holes 108. This is a convenient way of forming raw rubber stock into the bottom half of a mold where the depth is not great and the contour is not difficult. The stock 107 may be cut off by pressing down on the half mold 106 a plate with forming boss similar to the bottom plate 31 and boss 32 previously described.

Figure 31:
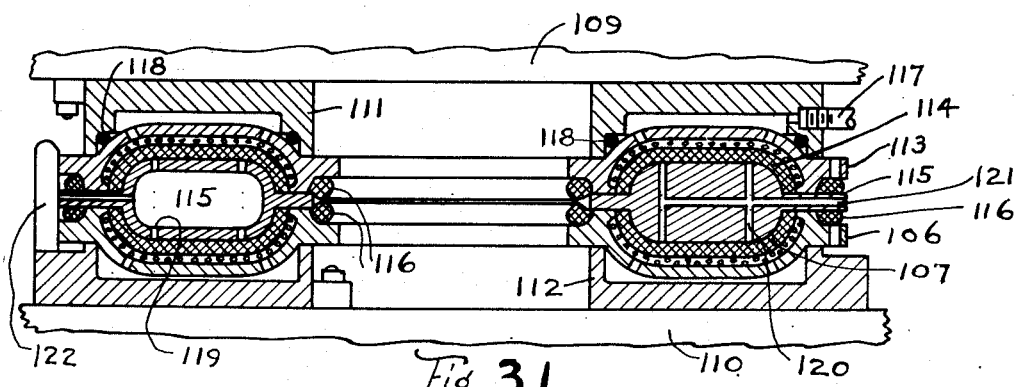
Fig. 31 is a section of a vented inner tube mold in place in the fixtures of a press at the moment of forming both sides of the tube by means of an intermediate removable forming plate.

Fig. 31 shows portions of the top plate 109 and bottom plate 110 of a press with a view in section of fixtures and inner tube devices. Fixture 111 is attached to the top plate 109 and fixture 112 to the bottom plate 110. Between the fixtures are inner tube upper half mold 113, inner tube raw stock 114, a plate 115 which is a combined bottom and top plate with forming bosses on it, inner tube raw stock 107 and inner tube lower half mold 106. The combination bottom and top plate 115 is shown with one form of venting at 119 and another form at 120, any suitable form of venting may be used including bosses of porous material. Fluid under pressure may be introduced through the holes 121 to make sure of the removal of the formed rubber from the plate 115, such as the air under pressure in workroom 7 or air under heavier pressure. Suitable guide members 122 may be provided and the same guides may guide the lower mold half 106, the combination plate 115 and the upper mold half 113.

It is obvious that fixture 112 in Fig. 31 may be provided with pneumatic equipment similar to that of fixture 111 for the more perfect control of the formed rubber 107. A mold half similar to mold half 27 of Fig. 2 with self-contained provision for pneumatic control of the formed rubber may also be used in connection with fixture 111 instead of the mold half 106.

Figure 32:
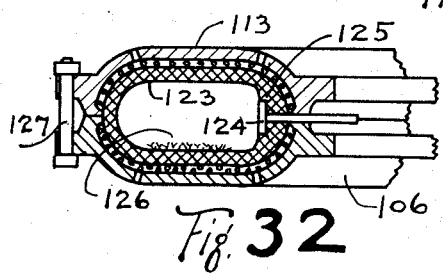
Fig. 32 is a partial section of a closed inner tube vented mold with tube stock in place.

Fig. 32 shows a partial section of a closed inner tube mold with inner tube 123 in place and a tire valve 124 also in place with a reinforcement of the tube 123 at the tire valve 124 shown by a thickened portion 125. Volatile material 126 may be placed in the tube before the mold is closed for furnishing a suitable internal pressure during vulcanization. The tire valve 124 may be utilized for admitting a suitable internal pressure by a connection at 103 in Fig. 29 to the forming bag 102. Bolts 127 may hold the mold closed during vulcanization. Vulcanizing may be in press or in open heat.

A convenient method of forming hollow rubber articles such as inner tubes is to place raw sheet rubber stock over a half mold as in Fig. 30. The half mold is placed in a bottom fixture on a forming press. On top of the stock in the lower half mold is placed a combined bottom and top forming plate and over this combined plate a sheet of raw rubber stock, in a manner similar to that described in Fig. 3. Over all these is placed the upper half mold. The press is then closed, and pressure is applied. The rubber sheets are formed and the excess stock is cut off. To close the inner tube, connection is first made to the atmosphere so that the upper half mold and the stock it contains will be held by the upper platen of the press as the press opens. Where needed gaskets make air tight joints between the platen and the upper half mold. When the press is opened the combined bottom and top forming plate is removed, the lower half mold and the rubber stock it contains remaining in place on the lower platen. The press is again closed, this time with the mold halves coming together and with the halves of the rubber stock meeting and cohering into an inner tube. Air trapped inside the tube is sufficient to keep the rubber of the tube from falling away from the surface of the mold lining until other fluid pressure is supplied. Where it is desired a tire valve, preferably with a reinforcement of rubber, may be placed between the mold halves in suitable grooves before closing the press, so that the tire valve may be vulcanized in place in the inner tube. Also volatile material may be placed in the inner tube before closing the mold for the purpose of producing a suitable fluid pressure in the tube during vulcanizing, or a suitable pressure may be maintained inside the tube by admitting a fluid under pressure through the tire valve and suitable connections from a supply.

This method of forming hollow rubber articles is applicable to other forms than inner tubes and I do not confine myself to any particular form of hollow article.

It is evident that the lifting of the upper mold half and its formed rubber by pneumatic pressure against the upper press platen is not the only way in which the method can be operated. For example, one alternative method consists in replacing the upper mold half, as illustrated in Fig. 31 by a mold half with pneumatic provision within itself, such as mold half 27 in Fig. 2. Such mold halves may be held against the upper platen by any suitable pneumatic or mechanical means.

Figs. 33 to 37 and Fig. 1 show an alternative means and method of using my mold lining of porous metal or other porous material without the use of pneumatic means for holding the rubber against the mold surface. In the manufacture of articles of formed sponge rubber this simplifies the equipment needed. Molds of this type can also be used for forming and vulcanizing articles of dense rubber as the porous lining permits air to escape allowing the rubber stock to conform accurately to the mold. An excess of dense raw rubber stock can be placed in the mold and as the mold is closed the excess will be forced out and cut off. This type of mold is particularly suitable for use in vulcanizing in a press but can be used in open heat vulcanizing by providing suitable means to keep the mold closed such as the bolts in Fig. 7.

Fig. 33 is a section on line B—B of Fig. 34 and shows a mold of a doll in which a solid metal frame 127 may be used to enclose and support a porous lining 29. Additional venting may be provided as by the holes 128. The joint of the mold is made with narrow faces 129 so that excess stock can be readily cut off when the mold is closed.

Fig. 34 shows a plan view of a mold adapted to form and vulcanize a sponge rubber solid article. The solid line 130 indicates the outline of the porous metal lining 29 and the dotted line 131 indicates the outline of the article, in this case a doll. Dowel pins for guides are shown at 132. Any suitable guide means may be employed. Solid lines 133 indicate the lines between depressed and full sized portions of the mold. The depressed portions of the mold are over parts of the article which are of small section such as arms and legs of the doll and the full sized part of the mold is over the parts of the article of large section such as the body and head. The depressions are for the purpose of aiding the more uniform heating of the sponge by delaying the heating of the thin parts. By depressing portions of the mold out of contact with the press platens this is accomplished, and a rapid flow of heat by conduction takes place where the sponge rubber is thickest and a slower transfer of heat is made by radiation where the sponge is thinner in section. By this means the expanding of the stock with heat and the set of the rubber sponge in vulcanization take place at about the same time in all parts of the article and produce more uniform texture than is the case where one part expands and cures before another.

Fig. 35 is a side view of Fig. 34 and shows the depressions of the arm parts 134 and leg parts 135 more clearly.

Figs. 36, 37, and 1 show in section on line A—A of Fig. 34 views in which the lower half mold 136 Fig. 36 is loaded with a sheet of sponge rubber stock 137, a lump of sponge rubber stock 138 in the head and body portions only, and a sheet of sponge rubber stock 139 laid over sheet 137 and lump 138. The upper half of the mold is shown in place ready for closing, in Fig. 36, while in Fig. 37 the mold is shown closed with the surplus stock 141 cut off by the cutting edges 129. Fig. 1 shows how, after vulcanization, the two sheets of rubber stock 137 and 139 have cohered and formed a skin 142 surrounding the central core 143 which was the lump 138 Figs. 36 and 37 which may be of different quality of sponge rubber stock such as a softer and more bendable sponge. It will be noted that in the arms and legs the sheets 137 and 139 alone formed these members.

The use of air at a pressure below atmosphere or at a partial vacuum for the purpose of sucking raw sheet rubber stock into molds is established practice in the rubber industry. The air in the workroom is at atmospheric pressure and a vacuum is established inside the mold which holds the rubber stock against the inside mold face. This method has disadvantages which are overcome in my method of pneumatic forming and holding rubber, in which air at atmospheric pressure is used as the low pressure or suction side of the pneumatic system and air under suitable compression is forced into the workroom and used as the high pressure side. By this method the low pressure side is perfectly reliable and no vacuum pump is needed, while the high pressure side when provided with suitable compressor is also very reliable. The great advantages of flexibility and convenience in forming and vulcanizing are obtained by my method at a minimal expense. The convenience is especially obvious in the desirable operation of entrapping air at a pressure above atmosphere in hollow rubber articles which is accomplished without extra apparatus and in most cases with no additional labor.

In forming sheet rubber stock into hollow articles by pneumatic means it is difficult to prevent the rubber sheet from stretching thinner in some parts than in others. This disadvantage is largely overcome by my method of placing the sheet rubber stock for a preliminary forming over a male forming member which is used in connection with the pneumatic forming of the sheet into the female member or mold.

It is obvious that such male forming member and female forming member or mold may be used to completely form the rubber in shape and thickness and the pneumatic arrangement be used only for holding the formed rubber in the mold during the various succeeding operations of manufacture.

My method of using porous metal as the material for the surfaces against which rubber articles are formed and against which they are held during vulcanization is of great importance in the producing of accurately formed articles of fine finish. The mold is thus thoroughly vented and composed of durable material, which keeps its shape and finish well. The porous lining is a good conductor of heat and vulcanizing is not interfered with.

This porous metal lining may be produced by any suitable means such as the use of granules of metal held by a suitable binder such as bakelite "Smooth-On" cement, Portland cement, solder of a melting point lower than that of the metal granules. A convenient way is to pour a mold with a mixture of molten solder and granules and drain off the excess solder. I do not confine myself to granules of any particular metal nor to any particular binder.

The porous metal lining may also be produced by electroplating a model of the article to be manufactured with a suitable metal such as iron or aluminum. An excess of electric current should be used so that the deposit of metal on the model is porous. When the deposit of porous metal is of suitable thickness it may be further prepared by forming around it a backing of metal granules held by a binder and outside that a frame of dense strong metal which is capable of standing the strain of the forming and vulcanizing presses. The frame may also be formed directly around the deposited porous metal or may be omitted entirely. Suitable provision for parting the mold and attaching dowels and dowel holes is made.

A further method of producing porous metal molds is by spraying molten metal of a suitable kind over a model of the article and reinforcing such built up porous shell by a frame formed around it of dense metal.

A further method of producing a porous mold is by casting over a model of the article an alloy or mixture of metals which has the quality of segregating on cooling in such manner that the metal of lower melting point can be melted out or allowed to run out with the result that the metal which remains cast on the model is porous. The porous cast metal may be reinforced by a frame of dense metal formed on it.

In any of these methods of producing a porous mold the reinforcing frame may be omitted where the porous metal is of sufficient strength.

I do not confine myself to any particular kind of porous metal lining for molds or press platens.

An alternative means of forming a porous mold lining is to use any suitable granules and any suitable binder such as asbestos fiber and plaster of Paris or silica sand and Portland cement or any other porous material which can be formed or cut to a mold form and preferably be reinforced by a dense metal shell. Such molds are cheap to produce and are suitable for the production of large hollow articles which are to be cured by the admission of steam to the interior of the articles. Molds with such porous linings have poor heat conductivity and therefore are adapted to use where heat does not need to be transferred by conduction or radiation as is the case where rubber articles are cured in open heat or independent vulcanizers. The steam or other hot fluid in this case comes into contact with the rubber either inside or outside or both inside and outside the article and heats it directly to the vulcanizing temperature without depending on the conductivity of the mold.

There are many variations of construction of workrooms supplied with air under compression, of molds with air connections and of porous linings for molds or porous molds, but all come within the spirit of my invention.

I claim:—

1. In a mold for a rubber article, a mold shell of non-porous metal and a mold lining of porous metal.

2. In a mold for rubber articles, the combination of a mold shell of dense metal, a mold lining of porous metal, a conduit from said porous metal lining through said dense metal shell, a pneumatic tube in connection with said conduit and means for opening and closing said pneumatic tube.

3. In a vulcanizing press, platens provided with a facing of porous metal.

4. In a forming plate, a forming boss projecting upward from said forming plate adapted to form an article from a sheet of raw rubber stock, said forming boss being composed of porous metal.

JOHN HUGH O'NEILL.